United States Patent [19]

Culberson et al.

[11] Patent Number: 4,977,229

[45] Date of Patent: Dec. 11, 1990

[54] POLYMERIC COMPOSITIONS FOR OPTICAL DEVICES

[75] Inventors: Doris A. Culberson, Baton Rouge, La.; Lon J. Mathias, Hattiesburg, Miss.

[73] Assignee: The University of Southern Mississippi, Hattiesburg, Miss.

[21] Appl. No.: 247,947

[22] Filed: Sep. 22, 1988

[51] Int. Cl.$^5$ .................. C08C 77/26; C08F 30/08
[52] U.S. Cl. ........................ 528/26; 528/28; 528/29; 528/30; 528/32; 528/33; 525/479; 526/279
[58] Field of Search .............. 528/26, 28, 29, 33, 528/30, 32; 525/479; 556/419, 417, 422, 428, 436, 437; 526/279

[56] References Cited

U.S. PATENT DOCUMENTS 4,235,985 11/1980 Tanaka et al. ................ 526/279

FOREIGN PATENT DOCUMENTS 60-032022 2/1985 Japan ................ 526/279
61-087102 5/1986 Japan ................ 526/279

Primary Examiner—Lewis T. Jacobs
Assistant Examiner—R. Dean, Jr.
Attorney, Agent, or Firm—Robert M. Phipps

[57] ABSTRACT

Contact and intraocular lenses are formed from a polymer formed by polymerizing one or more siloxane monomers of the formula

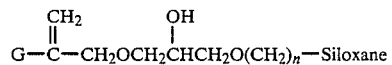

with monomeric crosslinking agents and optionally an acrylic or methacrylic acid ester of a monohydric alkanol. In the above formula G is an electron withdrawing group and the siloxane is a mono- or poly- siloxane group.

8 Claims, No Drawings

POLYMERIC COMPOSITIONS FOR OPTICAL DEVICES

BACKGROUND

1. Field of Invention

This invention relates to new polymeric compositions for use in contact and intraocular lenses and other optical devices.

2. Description of the Prior Art

Carboxylic acid containing polymers for contact lenses and other biomedical uses are well known, for instance see U.S. Pat. No. 3,822,089 granted July 2, 1974 to Otto Wichterle. Their major advantage is the enhanced water content of the polymer and higher oxygen permeability. However, these polymers have low mechanical strength. As a result, other polymeric compositions have been suggested. U. S. Pat. No. 3,937,680 granted to de Carle discloses a terpolymer of hydroxyethyl methacrylate, N-vinyl pyrrolidinone and acrylic acid. While water contents of up to 90% can be achieved, the mechanical properties are unsatisfactory. U.S. Pat. No. 3,988,274 granted Oct. 26, 1976 to E. Masuhara et al discloses that the strength of carboxylic acid containing polymers are enhanced by the use of alkyl methacrylates, e.g., n butyl methacrylate. Further, attempts to improve polymers include the addition of another vinyl monomer, vinyl acetate, see U.S. Pat. No. 4,143,017 granted Mar. 6, 1979 to N. Tarumi et al.

Polysiloxane containing polymers for contact lenses and other biomedical uses are also well known, for instance see U.S. Pat. No. 3,808,178 granted Apr. 30, 1974 to N. G. Gaylord. This patent discloses fabricating contact lenses from a copolymer of polysiloxanyl-alkyl acrylic ester and an alkyl acrylic ester. Improvements in these compositions have been developed. Among these are the improvements disclosed in U S. Pat. No. 4,153,641 granted May 8, 1979 to W. G. Deichert et al which discloses contact lenses made from polymers and copolymers comprising poly(organosiloxane) polymers and copolymers formed by polymerizing a poly(organosiloxane) monomer alpha, omega terminally bonded through divalent hydrocarbon groups to polymerized, free radical polymerizably activated, unsaturated groups forming a polymer in a crosslinked network. U.S. Pat. No. 4,208,506 granted June 1980 to W. G. Deichert et al discloses soft contact lenses made from polymers and copolymers comprising polyparaffinsiloxane polymers and copolymers formed by polymerizing a polyparaffinsiloxane monomer alpha, omega terminally bonded through divalent hydrocarbon groups to polymerized, free radical polymerizably activated, unsaturated groups forming a polymer in a crosslinked network. U.S. Pat. No. 4,303,772 granted Dec. 1, 1981 to N. N. Novicky discloses polysiloxanyl alkyl esters of acrylic and methacrylic acids and its copolymerization with alkyl esters of acrylic, methacrylic acids and/or itaconate esters to produce highly permeable contact lens material The copolymer preferably includes a crosslinking agent and hydrophilic monomer. Contact lenses manufactured from the material are easily machined and polished into hard or semi-hard contact lenses having excellent dimensional stability.

Yet, in spite of the foregoing advances further improvement in compositions for contact and intraocular lenses is desired Added patient comfort, greater visual acuity, durability and the like are desired This search is complicated because compounds similar to those employed above are not suitable for contact lenses. For instance, U.S. Pat. No. 3,743,669 granted July 3, 1973 to M. E. D. Hillman et al discloses that 2-(1-hydroxyalkyl)-acrylates and similar polymers have good adhesive properties.

Among the objects of this invention is to provide polymers for contact and intraocular lenses having improved optical properties, gas permeability, physical strength, machinability and biocompatibility.

SUMMARY OF THE INVENTION

In accordance with this invention there is provided as a new article of manufacture a contact or intraocular lens formed from a polymer formed by polymerizing (a) one or more monomers of having the formula

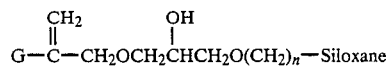

wherein:
G is an electron withdrawing organic radical,
Siloxane is a mono or polysiloxane group which optionally may be branched, linear, substituted or nonsubstituted, and
n is an integer from 1 to 6, (b) one or more monomeric crosslinking agents, and optionally (c) an ester of a monohydric alkanol or a monohydric fluorinated alkanol having from 1 to 20 carbon atoms and an acid selected from the group consisting of acrylic and methacrylic acids.

DESCRIPTION OF THE PREFERRED EMBODIMENTS

Improved contact lens and intraocular lens are obtained when the lenses are fabricated from the novel siloxane monomers of this invention. These monomers are desirably crosslinked by the use of novel "acrylate" dimers which were developed in the course of this invention. The novel siloxane monomers are of the formula

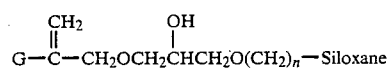

As noted above G is an electron withdrawing organic radical. Preferably G represents a group selected from ROC(O)—, NC—, $O_2N$—, $RSO_2$—, RSO—, $RPO_2$—, $(R)_2NC(O)$—, RHNC(O)—, $H_2NC(O)$—and RC(O)— in which each expression of R is independently selected from alkyl, branched alkyl, substituted alkyl and substituted branched alkyl, in each case R contains from 1 to 6 carbon atoms. A preferred substituent in the foregoing substituted alkyl and branched alkyl groups is fluorine. The fluorine may be substituted as desired, e.g., mono-, di-, perfluoro-.

The siloxane portion of the monomer is well known in the contact lens art. Typical siloxane moieties are disclosed in U.S. Pat. No. RE 31,406 granted Oct. 4, 1983 to N. G. Gaylord, U.S. Pat. No. 4,152,508 granted May 1, 1979 to E. J. Ellis et al, U.S. Pat. No. 4,216,303 granted Aug. 5, 1980 to N. N. Novicky, and U.S. Pat. No. 4,303,772 granted Dec. 1, 1981 to N. N. Novicky. U.S. Pat. No. RE 31,406 discloses siloxane moieties of the type

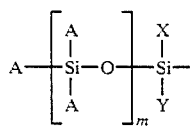

(II)

wherein
(1) X and Y are selected from the class consisting of $C_1$-$C_5$ alkyl groups, phenyl groups and Z groups,
(2) Z is a group of the structure

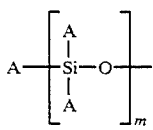

(3) A is selected from the class consisting of $C_1$-$C_5$ alkyl groups and phenyl groups, and
(4) m is and integer from one to five.

U.S. Pat. No. 4,152,508 discloses siloxane moieties of the type

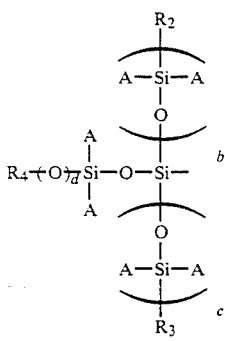

(III)

wherein
$R_1$ is selected from the group of hydrogen and methyl, "b" and "c" are integers from zero to two, "d" is an integer from zero to one, A is selected from the group of methyl and phenyl,
$R_2$ is selected from the group of methyl and phenyl,
$R_3$ and $R_4$ represent either no group, that is cyclic ring from "c" to "d" or methyl or phenyl.

U.S. Pat. No. 4,216,303 discloses siloxane moieties of the type

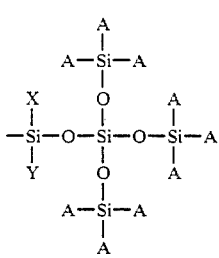

(IV)

wherein X and Y are selected from the class consisting of lower alkyl groups, cycloalkyl groups, phenyl groups (substituted and unsubstituted), polysiloxanyl groups, fluorine and Z groups; Z is a group of the structure:

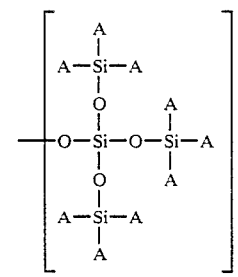

and wherein A is selected from the class consisting of lower alkyl groups and phenyl groups.

U.S. Pat. No. 4,303,772 discloses siloxane moieties of the type represented by the following formulas:

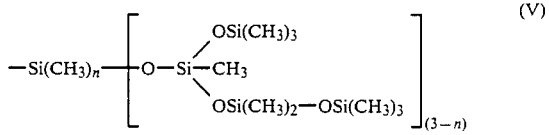

(V)

where
n is an integer 0,1,2. and by:

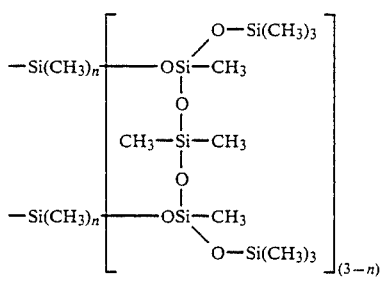

(VI)

The siloxane of Formula VI is a special case since the monomer with this moiety can also function as a cross linking agent in the same manner as the "acrylate" dimers discussed below.

Further descriptions of, variations and ramifications thereof as well as details of preparation for the respective moieties are found in the above cited patents which for convenience are incorporated herein by reference thereto. But, this compilation is not exhaustive of the various siloxane moieties known to the contact lens art which can be used in the preparation of the contact and intra ocular lenses of this invention. For instance, the normal substituted polysiloxane having one to six repeating siloxane units are also suitable as the siloxane moiety of this invention.

The unsatisfied valance of the Si group in the above formulas II through VI is satisfied by an alkylene group of 1 to 6 carbon atoms as shown in formula I above.

The siloxane monomer of this invention may be conveniently prepared by reacting the desired glycidylalkylsiloxane with a hydroxyalkyl acrylate, methacrylate or acrylonitrile. As previously noted the acrylate or methacrylate may be substituted by the replacement of the carbonyl group with other electron withdrawing groups such as esters, ketones, amides and the like as exemplified by
2'-ethylhexyl 2-(hydroxymethyl) acrylate,
2-(hydroxymethyl)-acrylonitrile, 3'-hydroxypropyl 2-(hydroxymethyl)-acrylate,
2'-diethylaminoethyl 2-(hydroxymethy)-acrylate, and methyl 2-(hydroxymethyl) acrylate A more embracing recitation of these substitutents is found in U.S. Pat. No. 4,659,432 granted Mar. 31, 1987 to R. Fikentscher et al. For the sake of convenience this recitation of substitutents and a convenient way of preparing the hydroxyalkyl acrylates, methacrylates and acrylonitriles is incorporated herein by way of reference. Other suitable compounds of this class are disclosed in U.S. Pat. No. 3,743,669 granted July 3, 1973 to M.E.D. Hillman et al and which for convenience the recitation of these compounds is incorporated herein by reference.

The major by-product of the acrylic monomer syntheses mentioned above is a dimer. These "acrylate" dimers with ether linkages and the siloxane monomer of this invention when the siloxane portion is that of Formula VI above contain two sites of unsaturation and can be used as a crosslinking agent in preparing polymers from the siloxane monomers (Formula I) of this invention.

The hydroxyalkyl acrylic monomer is reacted with the glycidyl siloxane monomer in an inert atmosphere and in the presence of a catalyst such as fine dry alumina, Raney metal, tetrafluoroboric acid diethyl ether (also known as $HBF_4$ etherate) or other well known catalysts for epoxide reactions. The amount of catalyst employed will vary with the type, temperature and desired reaction rate. The inert atmosphere can be conveniently obtained by the use of a nitrogen, argon, carbon dioxide or the like gas blanket to exclude the presence of oxygen. The acrylic monomer initially present is about 4 to 5 percent of the total weight of the alumina present. One mmol of the glycidyl siloxane per 7 to 8 grams of alumina and diethyl ether are charged to the reaction vessel. The mixture is stirred to obtain a slurry and allowed to react at room temperature While the reaction can be maintained for up to 5 days suitable results and yields are obtained after 1 day. The ether slurry is then filtered through a diatomaceous pad. To enhance recovery of the product the pad is washed with chloroform, however, other solvents having similar characteristics may be used. The chloroform is then removed by vacuum. The filtrate is then fractionated by freezing overnight to obtain a clear yellow liquid monomer having a top layer of white solid particles which are discarded. The final ratio of starting materials to the desired siloxane monomer product having Formula I is 1:2. The ratio of starting acrylate, etc., to epoxide or glycidyl siloxane reactants can be varied from 10:1 to 1:100 as desired while a more preferred ratio would be from about 2:1 to about 1:100.

The siloxane monomer thus prepared can be polymerized or copolymerized with other siloxane monomers of this invention, as well as acrylic and methacrylic acid esters of monohydric alkanols having 1 to 20 carbon atoms, using any of the various crosslinking monomers well known in the contact and intraocular lens arts to obtain polymers suitable for contact lens and intraocular lenses.

The acrylic and methacrylic acid esters maybe employed to modify the physical characteristics of the siloxane polymerizates application. The alkanol used in preparing the ester may be non-substituted or substituted as desired in part or in whole with fluorine. Additionally, the alkanol may be normal (straight), branched or cycloalkyl. Exemplary of the alkanols are butyl, dodecyl, ethyl, hexadecyl, isopropyl, methyl, 3,3-dimethylbutyl, octadecyl and tertiary butyl. Suitable cycloalkyl alkanols include cyclohexyl, tertiarybutyl-cyclohexyl and tertiarybutyl-cyclopentyl.

More particularly the polymers may be crosslinked or polymerized with the above discussed acrylic ether dimers either singularly or in combination as well as in combination with prior art crosslinking agents. The crosslinking monomer(s) are present in an amount from 0.01 to 10 weight percent and preferably from 0.1 to about 3.0 percent. Suitable prior art crosslinking agents include mono-, di-, tri-, tetra-, poly-, ethylene glycol diacrylates or dimethacrylates, vinyl or allyl acrylates or methacrylates, divinylbenzene, allyl esters such as diallyldiglycol dicarbonate, diallyl maleate, diallyl fumarate, diallyl itaconate, vinyl esters such as divinyl oxalate, divinyl malonate, diallyl succinate, and the like, triallyl isocyanurate, the dimethacrylates or diacrylates of bis-phenol A or ethoxylated bis-phenol A, hexamethylene bisacrylamide or hexamethylene bismethacrylamide and di(alkene tertiary amine) compounds disclosed in U.S. Pat. 4,436,887 granted Mar. 13, 1984.

The free radical type initiators suitable for this invention include peroxides, azo compounds, UV initiation, oxidation-reduction systems and similar initiators described in the literature. Illustrative of free radical initiators which can be employed are bis(isopropyl) peroxy dicarbonate, 2,2'-azobis(isobutyronitrile), acetyl peroxide, benzoin methyl ether, lauroyl peroxide, decanoyl peroxide, benzoyl peroxide, 2,2'-azobis(2,4-dimethylvaleronitrile), tertiarybutyl peroctoate, phthalic peroxide, cumene hydroperoxide, diethoxyacetophenone, tertiarybutyl peroxypivalate and the like.

The polymers of this invention can be formed into intraocular and contact lenses by methods well known in the art. By way of example mixture of the desired siloxane monomer of this invention (Formula I), free radical type initiator, crosslinking agent and any optional crosslinker or monomer described above is purged with an inert gas such as nitrogen, argon or carbon dioxide and filled into polypropylene tubes having dimensions of 18 mm × 300 mm. The polymerization is then carried out by gradually heating from 30° C. to 110° C. in a step fashion over a span of several days. In a typical schedule the tubes are placed in a water bath from 30° C. to 50° C. for two to three days followed by two days at 60° C. The rod is then removed from the mold and post-cured at 110° C. for a period of up to about four hours. The fully cured rods are then cut into cylinders, optionally then annealed at temperatures up to 150° C. and machined to form contact lenses as desired. Other conventional methods such as compression molding as disclosed in U.S. Pat. Nos. 4,084,459 and 4,197,266 or spincasting process as described in U.S. Pat. Nos. 3,408,429 and 3,496,254 can be employed to prepare useful objects of this invention. Additionally, the monomeric mixture can be static cast in lens molds and thereafter the remaining lens surface cut, or prepared, on a lathe.

The contact lenses made from the polymer of the instant invention are oxygen permeable. A critical oxygen tension and flux under a lens should be about 10 mm Hg and 2 ml/($cm^2$hr.) respectively below which corneal swelling occurs, see Polse and Decker, *Investigative Ophthalmology and Visual Science,* vol. 18, p 188, 1979. In order to meet these requirements, the lens material must have adequate oxygen permeability. These more preferred contact lenses have an oxygen permeability of at least about $24 \times 10^{-11}$ cm$^3$cm/(sec.cm$^2$) mm Hg, are hydrolytically stable, biologically inert and transparent. The most preferred contact lenses have an oxygen permeability of at least $30 \times 10^{-11}$. In comparison, the well-known contact lens polymer poly(hydroxyethyl methacrylate) has an oxygen permeability value of about one-third of the polymers of this invention.

Another desirable feature of these polymers of this invention is the contact lenses and intraocular lenses made from them are wetable, thus providing greater comfort to the wearer.

Additionally, these lenses are hydrolytically stable meaning that when the contact lenses are placed into an aqueous solution, e.g., on the eye, or during the disinfecting step, i.e., water plus heat, the lenses will not change in chemical composition, i.e., hydrolyze. On heating in boiling water for 120 hours, the typical polymer of this invention experiences a water content loss of three percent or less. The most preferred lenses/polymers of this invention have a stable, i.e., less than one percent change, water content.

Thus, the polymers and copolymers disclosed herein can be boiled and/or autoclaved in water without being damaged whereby sterilization may be achieved An article formed from the disclosed polymers and copolymers may be used in surgery where an article compatible with living tissue or with the mucous membranes may be used.

The polymers and copolymers of this invention being soft yet resilient and hard to tear are well suited for use in contact lenses. It is well known that the wearer of contact lenses will have an unavoidable amount of handling of the lenses. Part of the cleaning and rinsing procedure is to rub each lens and tearing has been a concern in prior art lenses. The polymers and copolymers of the present invention have a tear initiation strength (ASTM D-1938) of at least 3 g/mm of thickness and preferably 4 g/mm or more. Additionally the resiliency and tear resistance of these polymers contribute to excellent machinability, e.g., lathing, of the polymer.

These polymers can also be used in preparing intraocular lenses which require similar properties.

The following examples are illustrative only and should not be construed as limiting the invention. All parts and percents referred to herein are on a weight basis. Temperature is expressed in degrees Celsius unless otherwise specified.

A. PREPARATION OF ACRYLIC MONOMERS

EXAMPLE I

Butyl acrylate and paraformaldehyde, at a 3:1 molar ratio, respectively, are added to an Erlenmeyer flask, along with 0.0891 moles of 1,4-diazabicyclo[2.2.2]octane (available under the trademark DABCO) and a magnetic stir bar. The reaction mixture is placed on a hot plate stirrer on low heat The reaction is followed by gas chromatography (Hewlett-Packard 5880A Series, Gas Chromatograph) until all formaldehyde is consumed. The unreacted butyl acrylate is removed by distillation under rotary evaporation at 0.250 mm Hg pressure. The crude product is dissolved in ether and placed in a separatory funnel. The ether layer is extracted three times with dilute HCl to remove the DABCO. The ether layer is then dried overnight with sodium sulfate. The sodium sulfate is filtered out and the ether is removed under vacuum. After the DABCO is removed the crude product is slowly distilled under 0.250 mm Hg vacuum using a heating mantle and stirrer with cuprous chloride added as an inhibitor. The fraction boiling between 70° and 80° is collected with a purity of about 90%. A second distillation yields monomer, boiling at approximately 74° with a purity of 98% by gas chromatography. The product is butyl hydroxymethylacrylate, which for convenience is referred to as BHMA.

Other well known inhibitors, such as hydroquinone, are also useful in the distillation step of this example.

EXAMPLE 2

Ethyl acrylate and paraformaldehyde at a 3:1 molar ratio are added to an Erlenmeyer flask, along with DABCO, 0.0891 moles, and a magnetic stir bar. The reaction mixture is placed on a hot plate stirrer on low heat. The reaction is followed by gas chromatography. The unreacted ethyl acrylate is removed at 0.250 mm Hg by rotary evaporation. The crude product is dissolved in ether and placed in a separatory funnel. The ether layer is extracted three times with dilute HCl. The HCl wash is back extracted with ether to remove any water-soluble monomer. Both layers are dried overnight with sodium sulfate. The sodium sulfate is filtered out and the ether is removed by rotary evaporation. The monomer extracted from the HCl wash is of high purity. Both fractions are slowly distilled at 0.250 mm Hg, using a heating mantle, magnetic stirrer and stirbar, with hydroquinone added as an inhibitor. The fraction boiling between 60° and 70° C. was collected and the gas chromatography indicated a purity of about 90%. A second distillation yields monomer boiling at approximately 64° with a purity of 98% by gas chromatography. The product is ethyl hydroxymethylacrylate, which for convenience is referred to a EHMA.

The monomers of Examples 1 and 2 are characterized by C$^{13}$ Nuclear Magnetic Resonance (NMR) and Infrared Spectroscopy (IR). Both NMR and IR give spectra that are consistent with the structure of the monomers. The IR shows the hydroxy, alkyl, and ester absorptions at 3500 cm$^{-1}$, 2900 cm$^{-1}$, and 1700 cm$^{-1}$, respectively. Distinguishing between the —CH$_2$O— peaks on the C$^{13}$ NMR spectra is accomplished by using deuterated paraformaldehyde to identify the allylic —CH$_2$O—.

Another useful acrylic monomer prepared as above is methyl hydroxylmethyl acrylate, which for convenience is referred to as MHMA.

The major by-product of the monomer syntheses of Examples 1 and 2 is a dimer. These dimers with ether linkages can be used as crosslinking agents. A distillation of the monomer residue at 0.250 mm Hg yields a fraction that boils at approximately 90°–100° C. for the EHMA ether, and 120°–140° C. for the BHMA ether.

B. PREPARATION OF THE MONOMERS OF THIS INVENTION

EXAMPLES 3–6

Alumina (activated neutral, Brockmann I standard grade-150 mesh, 58 Angstrom) is added to a dried and tared Erlenmeyer flask. The alumina is dried overnight at 500° C. to remove any absorbed water. The flask is stoppered and cooled and then the weight of the alumina is determined. The alumina is stored in a nitrogen filled glovebag. The monomer (4% by total weight of alumina) and 1 mmol of 3-glycidoxypropylpentamethyldisiloxane (Petrach Chemical Company) per 7.5 g of alumina are weighed in tared vials and placed in the nitrogen filled glovebag, along with enough diethylether to form a slurry. A slurry is made with the ether to which the monomer and siloxane are added along with 2–3 ml of additional ether (see Table 1 below). After an appropriate amount of time, the slurry is filtered through a celite pad and washed well with chloroform. The chloroform is removed under vacuum to yield the crude product. The product is placed in a freezer overnight. Two layers form, a top layer of white solid-like particles and a bottom layer of clear yellow liquid monomer. The lower layer of crude product is separated and filtered, and a gas chromatograph is taken of the sample diluted in chloroform.

The crude products are approximately 2:1 molar ratios of alkylhydroxymethylacrylates to ring-opened siloxane monomer. Each is characterized by $C^{13}$ solution NMR. The spectra show disappearance of the epoxy carbons at 43 and 50 ppm and the appearance of additional —$CH_2O$— peaks in the 60–80 ppm region. There are two sets of two vinylidine $H_2C=C$ peaks which correspond to the molar ratio of products. The carbonyl, alkyl ester carbons, and methylsilane carbons are clearly identifiable.

The gas chromatography results (see Table 2 below) show the 24 hour reaction to be much cleaner than the 5 day reaction. The final ratio of starting material to ring-opened product is 1:2.

TABLE 1

| EXAMPLE NUMBER | REACTANTS ACRYLIC MONOMER TYPE AMOUNT, g | ALUMINA, g | SILOXANE GRAMS | mmol |
|---|---|---|---|---|
| | 24 hour reaction period | | | |
| 3 | BHMA 0.329 | 8.219 | 0.263 | 1.096 |
| 4 | EHMA 0.633 | 15.822 | 0.527 | 2.110 |
| | 5 day reaction period | | | |
| 5 | BHMA 11.296 | 282.39 | 9.883 | 37.652 |
| 6 | EHMA 10.760 | 269.00 | 9.415 | 35.866 |

TABLE 2

| GAS CHROMATOGRAPH RESULTS FOR EXAMPLES 3-6 | | | |
|---|---|---|---|
| | | Area (% Total) | |
| Crude Products | Retention Times | 24 hrs. | 5 days |
| EHMA | 2.37 | 39 | 32 |
| BHMA | 6.89 | 37 | 35 |
| EHMA-Siloxane | 18.70 | 47 | 54 |
| BHMA-Siloxane | 20.66 | 54 | 55 |
| Impurities EHMA | 11.52, 11.77, 12.34 | — | 2,5,3 |
| Impurities BHMA | 10.14, 11,75, 13,82 | — | 1,3,1 |

A comparison of solid state $C^{13}$ CP-MAS NMR spectra for Polymers Containing Silane derivatives of BHMA and EHMA shows the disappearance of alkene peaks in the 100–150 ppm region which indicates complete polymerization. The carbonyl peaks are seen at 175 ppm. The alkyl carbons of the ester side-chain and the methyl silane carbons are also clearly seen in the spectra. The various —$CH_2O$— peaks are relatively similar and overlap to form a broad peak in the 60–75 ppm region.

EXAMPLE 7

The reaction of EHMA with 3-glycidoxypropylpentamethyldisiloxane (hereafter referred to as GOMDS) is carried out using tertafluoroboric acid-diethyl ether complex as the catalyst. A 3:1 molar ratio of EHMA to GOMDS was used, although this ratio may be varied to provide different product ratios. The excess EHMA is used as a solvent and to promote complete reaction of GOMDS without forming large amounts of the addition product of the desired product with a second molecule of GOMDS. The reaction is monitored by gas chromatography. Samples are taken before, one hour after, and 16 hours after the catalyst addition, and after catalyst extraction. Reactant and product rations are given in Table 3 below.

The reaction mixture consists of 5 grams of GOMDS and 7.43 grams of EHMA in a 25 ml roundbottom flask equipped with a stirbar. After the first gas chromatograph sample is taken, 0.124 grams of tertafluoroboric acid-diethyl ether was slowly added to the flask. The reaction is allowed to continue overnight at room temperature. The solution is then dissolved in methylene chloride and washed with a 5% solution of sodium bicarbonate to stop the reaction by extracting the acid catalyst. The gas chromatograph peaks around 3.1, 11.07 and 19.7 represent respectively EHMA, GOMDS and the desired siloxyl reaction product. The reaction is essentially complete after 3 to 4 hours. The drop in EHMA ratios to GOMDS and product after work-up is due to the slight solubility in water and loss of the EHMA into the extraction mixture.

Additional monomers utilizing other acrylic or nitrile monomers in combination with the siloxane of Table 2 are satisfactorily prepared by the foregoing method. Still other monomers are satisfactorily prepared when other siloxanes are substituted for the foregoing siloxanes.

TABLE 3

| RATIO OF GAS CHROMATOGRAPH PEAK AREAS | | | |
|---|---|---|---|
| Peak No. | Reaction Time, hrs | Ratio of EHMA: GOMDS | Ratio of EHMA: Product |
| 1 | 0 | 1.66 | none |
| 2 | 1 | 14.4 | 1.87 |
| 3 | 16 | 18.1 | 2.07 |
| 4 | 16 (after extraction) | 16.4 | 1.54 |

C. PREPARATION OF POLYMERS AND COPOLYMERS

To tared 2 gram vials, measured amounts of monomers, 5% by total weight of monomers of the dimer crosslinking agent, and 4% by total weight of the sample of dimethyl ether of benzoin (available under the trademark Irgacure 651) are added. The samples are placed inside a nitrogen-filled glovebag along with a 365 nm UV lamp, disposable pipets, and labeled nylon polymerization cups. The samples are purged by bubbling nitrogen through them with a pipette for a minute inside the glovebag. Over the top of the lamp is suspended a sheet of plate glass on which the nylon cups are placed and filled. The filled cups are allowed to undergo photoinitiated polymerization. The polymerization mixtures for oxygen permeable hard contact lenses are tabulated in Table 4 below.

TABLE 4

POLYMERIZATION MIXTURES

| EXAMPLE NO. | ACRYLATE[1] AND AMOUNT, g | SILOXANE[2] AND AMOUNT, g | METHYL METHACRYLATE, g | CROSSLINK[3] MONOMER, g |
|---|---|---|---|---|
| 8 | A 0.37 | C 0.46 | 0.3 | E 0.094 |
| 9 | A 0.632 | C 0.46 | 0.5 | E 0.157 |
| 10 | A 0.58 | C 0.46 | 1.1 | E 0.345 |
| 11 | A 3.16 | C 0.46 | 2.1 | E 0.659 |
| 12 | A 0.37 | C 0.46 | 0.78 | E 0.177 |
| 13 | A 0.37 | C 0.46 | 0.22 | E 0.089 |
| 14 | A 0.37 | C 0.46 | 0.031 | E 0.059 |
| 15 | A 0.37 | C 0.46 | 0.786 | E 0.177 |
| 16 | A 3.16 | C 0.47 | — | E. 0.333 |
| 17 | B 0.36 | D 0.40 | 0.3 | F 0.076 |
| 18 | B 0.52 | D 0.40 | 0.5 | F 0.127 |
| 19 | B 1.30 | D 0.40 | 1.1 | F 0.280 |
| 20 | B 2.6 | D 0.40 | 2.1 | F 0.535 |
| 21 | B 0.36 | D 0.38 | 0.622 | F 0.128 |
| 22 | B 2.6 | D 0.48 | — | F 0.227 |
| 23 | B 0.632 | D 0.46 | 0.0556 | F 0.871 |

NOTES:
[1]A - BHMA of Example 1 B - EHMA of Example 2
[2]C - BHMA/Siloxane monomer of Example 3 D - EHMA/Siloxane monomer of Example 4
[3]E - BHMA ETHER DIMER F - EHMA ETHER DIMER Portions of the monomeric mixtures of Examples 9, 10, 11, 18, 19, 21 and 23 were cast into contact lens molds and then polymerized as described above. After polymerization, the molds were placed in a contact lens cutting lathe and contact lens shaped articles were prepared. The articles were optically satisfactory for contact lenses, and had constant radii. While the articles were being prepared it was noted the polymers had satisfactory lathing and release properties.

Suitable intraocular lens articles are also obtained by this method.

Example 10 is repeated except that the siloxane is the siloxane is the monomer of Example 7. From the polymerizate so obtained optically satisfactory articles are obtained.

Suitable contact lens shaped articles are also obtained when the methyl methacrylate of Table 4, above, is replaced with like amounts of perfluoroethyl methacrylate.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which as exclusive property or privilege is claimed are defined as:

1. As a new article of manufacture a contact or intraocular lens formed from a polymer formed by polymerizing (a) one or more monomers having the formula

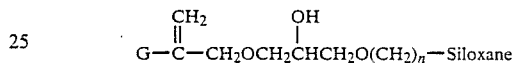

wherein:
G is an electron withdrawing organic radical selected from the group of ROC(O)—, NC—, $O_2N$—, $RSO_2$—, RSO—, $RPO_2$—, $(R)_2NC(O)$—, RHNC(O)—, $H_2NC(O)$— or RC(O)— in which each expression of R is an independently selected alkyl group containing from 1 to 6 carbon atoms,
Siloxane is a mono- or poly-siloxane group which is linear or branched and
n is an integer from 1 to 6, (b) one or more monomeric crosslinking agents selected from the group consisting of diacrylates, vinyl acrylates, allylacrylates, divinyl benzene, diallylesters, divinyl esters, triallyl isocyanurate, hexamethylene bisacrylamide, di(alkene tertiary amine) compounds, diacrylate polysiloxane and mixtures thereof,
and optionally, (c) an ester of a monohydric alkanol having from 1 to 20 carbon atoms or a monohydric fluorinated alkanol having from 1 to 20 carbon atoms and an acid selected from the group consisting of acrylic or methacrylic acids.

2. The article according to claim 1 wherein G is of the formula ROC(O)—.

3. The article according to claim 2 wherein R is alkyl.

4. The article according to claim 3 wherein R is fluoroalkyl.

5. The article according to claim 4 wherein an ester of a monohydric alkanol is present.

6. The article according to claim 5 wherein the ester is methyl methacrylate.

7. The article according to claim 1 wherein the siloxane is a linear polysiloxane.

8. The article according to claim 1 wherein the siloxane is a branched polysiloxane.

* * * * *